United States Patent
Fournier et al.

(10) Patent No.: US 8,650,142 B2
(45) Date of Patent: Feb. 11, 2014

(54) METHOD AND DEVICE FOR PERFORMING A MAINTENANCE FUNCTION

(75) Inventors: François Fournier, Roques/Sur/Garonne (FR); Stéphanie Gaudan, Toulouse (FR); Christian Sannino, Toulouse (FR)

(73) Assignee: Thales, Neuilly sur Seine (FR)

( * ) Notice: Subject to any disclaimer, the term of this patent is extended or adjusted under 35 U.S.C. 154(b) by 458 days.

(21) Appl. No.: 12/974,195

(22) Filed: Dec. 21, 2010

(65) Prior Publication Data
US 2011/0153535 A1    Jun. 23, 2011

(30) Foreign Application Priority Data
Dec. 23, 2009    (FR) .................................... 09 06287

(51) Int. Cl.
G06F 17/00    (2006.01)
G06N 5/02    (2006.01)

(52) U.S. Cl.
USPC ........................................... 706/46; 717/124

(58) Field of Classification Search
None
See application file for complete search history.

(56) References Cited

U.S. PATENT DOCUMENTS

| | | | |
|---|---|---|---|
| 6,687,653 B1 | 2/2004 | Kurien et al. | |
| 7,081,729 B2 | 7/2006 | Chang et al. | |
| 2007/0028220 A1* | 2/2007 | Miller et al. | 717/124 |
| 2008/0039993 A1* | 2/2008 | Cleary et al. | 701/29 |
| 2009/0112379 A1 | 4/2009 | Geiter | |
| 2009/0138141 A1* | 5/2009 | Nwadiogbu et al. | 701/3 |

FOREIGN PATENT DOCUMENTS

FR    2851660    8/2004

OTHER PUBLICATIONS

"The Joint Strike Fighter (JSF) PHM Concept: Potential Impact on Aging Aircraft Problems"; Mr. Andrew liess Navair Propulsion and Power, Diagnostics 22195 Elmer Rd. Bldg. 106 Patuxent River, ML) 2070; 2002.*

* cited by examiner

*Primary Examiner* — Kakali Chaki
*Assistant Examiner* — Luis Sitiriche
(74) *Attorney, Agent, or Firm* — Baker Hostetler LLP (57) ABSTRACT

A method for performing a maintenance function of a system under diagnosis includes a step for hierarchical decomposition of the system under diagnosis into sub-systems based on the model of the system and, for each sub-system, steps for determination of a model of the sub-system starting from the model of the system, and allocation of a diagnostic method depending on the processing and memory resources of said sub-system. The method allocated is a first diagnostic method based on the model of the system or a second diagnostic method based on predefined logical relationships. The method further includes calculation of the logical relationships for the sub-systems implementing the second diagnostic method, and the transfer of the logical relationships to the sub-systems implementing the second method and the transfer of the model to the sub-systems implementing the first method.

12 Claims, 10 Drawing Sheets

METHOD AND DEVICE FOR PERFORMING A MAINTENANCE FUNCTION

CROSS-REFERENCE TO RELATED APPLICATION

This application claims priority to foreign French patent application No. FR 09 06287, filed on Dec. 23, 2009, the disclosure of which is incorporated by reference in its entirety.

FIELD OF THE INVENTION

The invention relates to the maintenance of a system of an aircraft composed of one or more equipment units, such that this system fulfills various functions necessary for the completion of a flight.

BACKGROUND OF THE INVENTION

Figure 1:
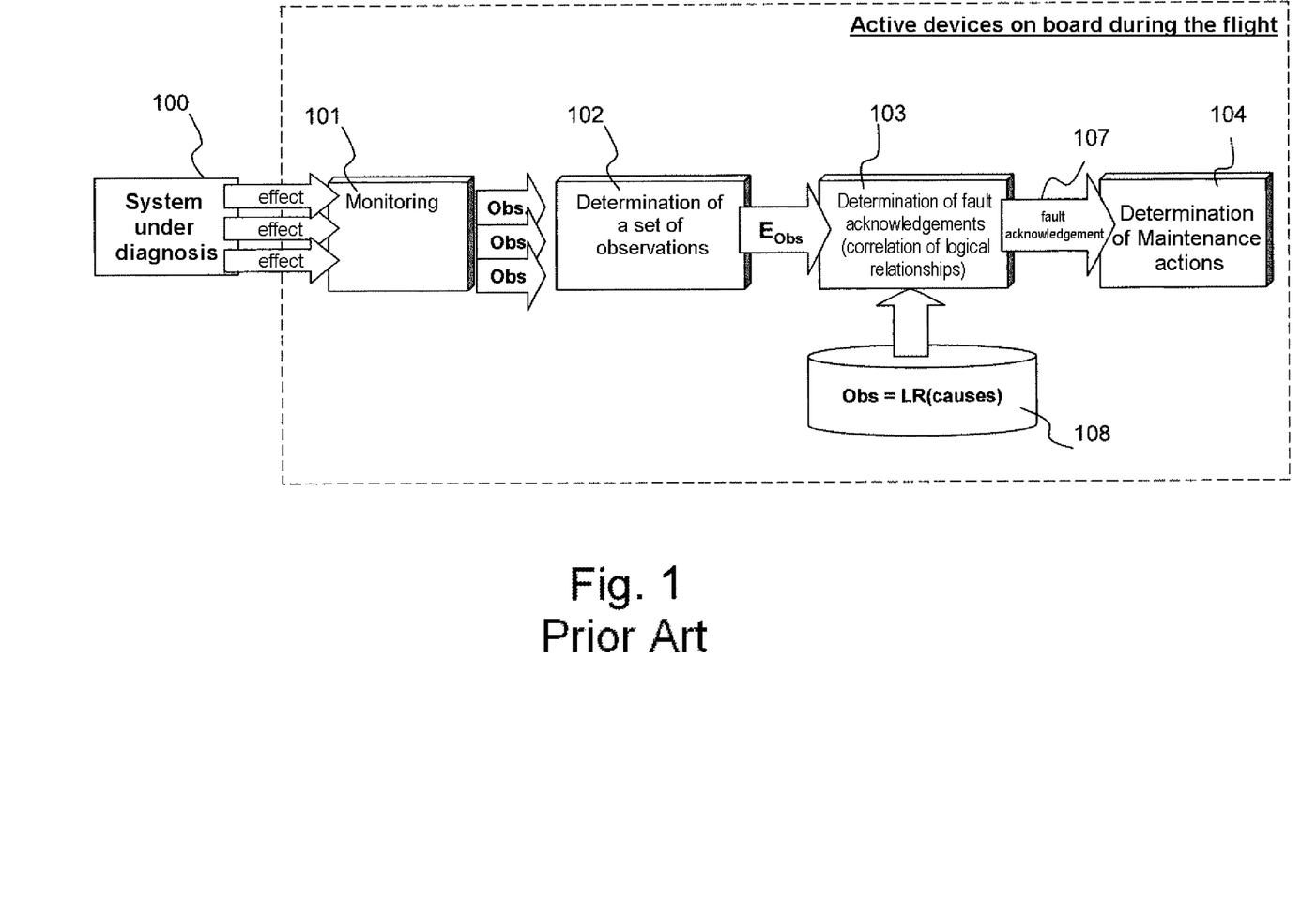
FIG. 1, already presented, illustrates one example of an architecture of a device for system diagnostics according to the prior art.

FIG. 1 illustrates one example of an architecture of a device for system diagnostics according to the prior art. The system, referred to as system under diagnosis, includes various equipment units. The diagnostic device typically includes: means 101 for monitoring the equipment, the means generating observation messages $O_1, O_2, \ldots, O_n$ based on effects coming from the system 100; means 102 for determining a set of observations $E_{obs}$ from the observation messages $O_1, O_2, \ldots, O_n$ coming from the monitoring means 101; means 103 for determining fault acknowledgements 107 from observations $O'_1, O'_2, \ldots, O'_k$ from the set of observations $E_{obs}$ and a set of logical relationships 108 between the observations and the causes having generated the observed effects; and means 104 for determining maintenance operations from the fault acknowledgements 107.

The set of logical relationships 108 is typically produced by the designer.

The monitoring means 101 are, for example, implemented by physical sensors or logical functions of the equipment MONITORING type.

The observations used may denote information on correct operation or on malfunctioning. The presence or the absence of a message is therefore interpreted differently depending on the type of operation observed. Indeed, during normal operation, certain messages are present and others are absent. For example, a unit of equipment may indicate that it is operating correctly by a periodic "healthy" message, and it may also indicate a malfunction, when this is detected, by a "fault_XX" message. The absence of a "healthy" message is therefore interpreted differently from the absence of a "fault_XX" message.

One of the drawbacks of such a device is the difficulty in establishing a set of logical relationships 108 that will provide a reliable and accurate diagnostic. This problem is solved by using a formal description of the system.

From this formal description, various diagnostic methods may be deduced that consume different amounts of memory or processing resources. A method known as RBR (Rule-based reasoning) or a method known as MBR (Model-based reasoning) may for example be mentioned.

Figure 2A:
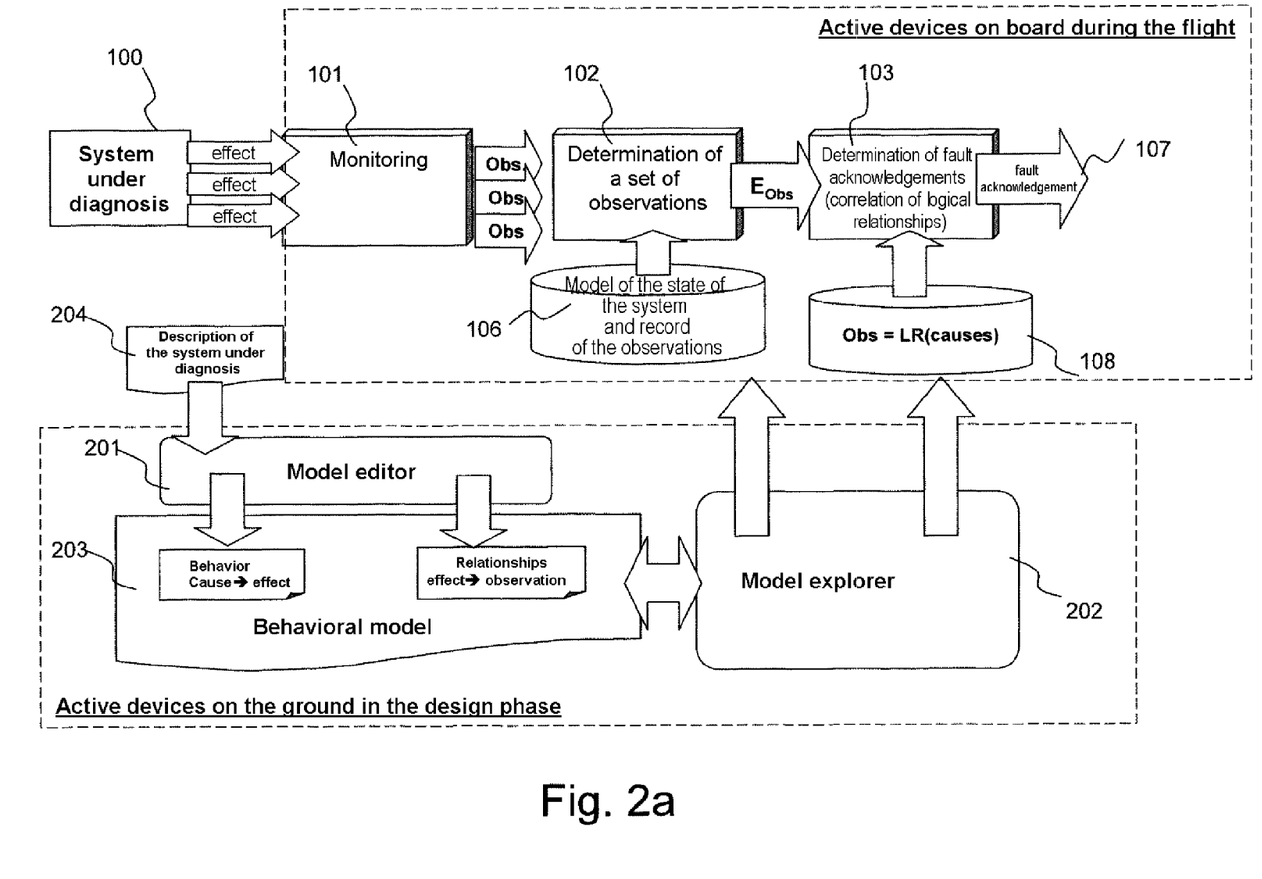
FIG. 2a, already presented, illustrates one example of implementation of a diagnostic method based on logical rules expressed in the form of an equation.
Figure 2B:
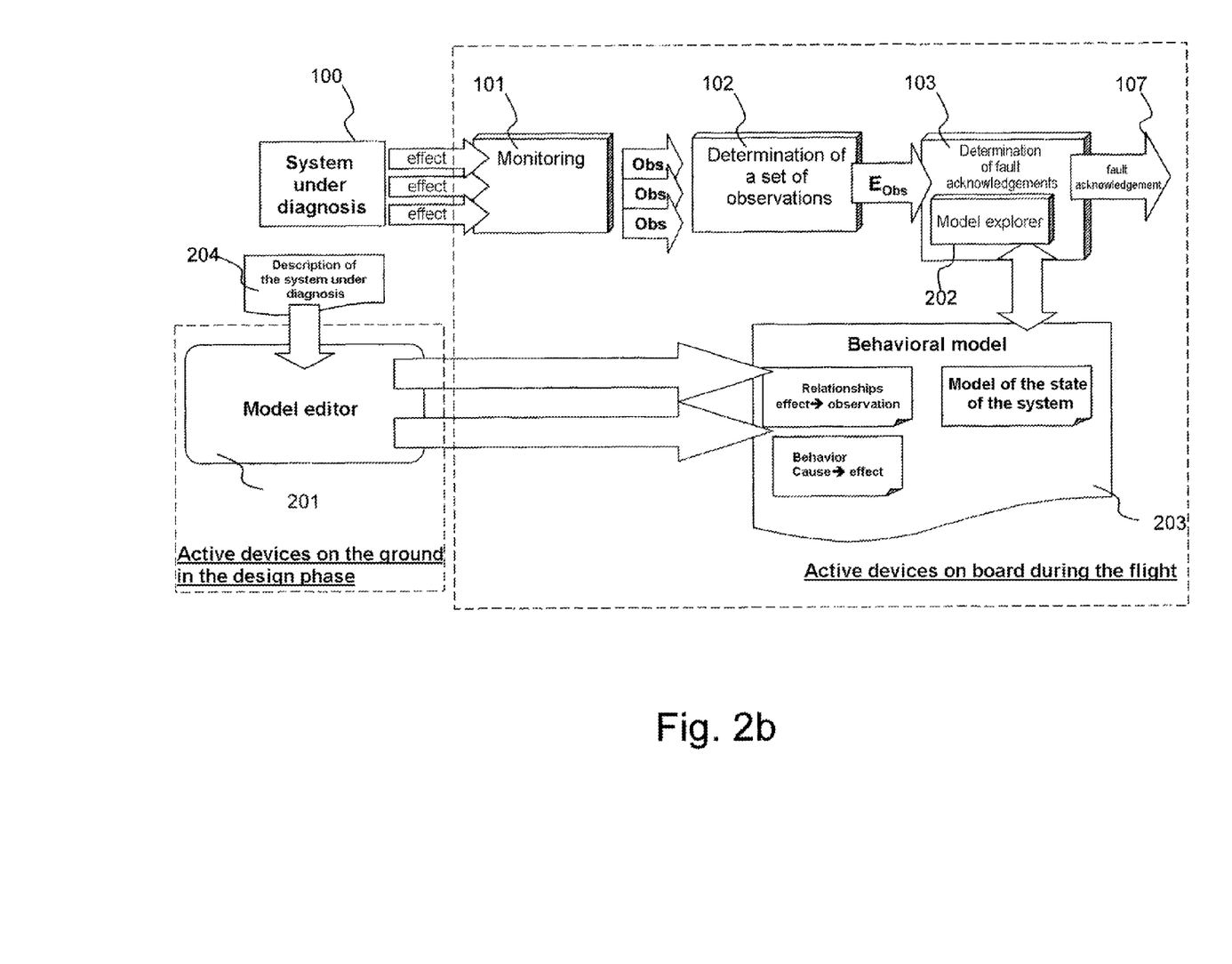
FIG. 2b, already presented, illustrates one example of implementation of a diagnostic method based on the models.

A first diagnostic method, known as MBR, may be implemented by using a model explorer, one exemplary embodiment of which is illustrated in FIG. 2b. The model explorer 202 allows the direct exploration of the behavioral model 203 of the system and the extraction of events having led to the observation of the effects by the monitoring means 101 in the form of sequences. The determination of fault acknowledgements 107 is located onboard the aircraft and is carried out during the flight. The search for a cause is carried out by dynamic exploration of the model 203 during the flight.

This method uses a model editor 201 allowing the behavioral model to be generated or edited based on a description 204 of the system under diagnosis and the observations.

This method has the advantage of providing a sequence of events causing the observed effects and the possibility of taking into account, where appropriate, modifications to the system 100, due for example to reconfigurations during the flight, these modifications having been reproduced by the model 203.

On the other hand, this method can consume a large amount of processing resources and may not be well adapted to certain types of aircraft onboard computers.

A second diagnostic method shown, known as RBR, may be implemented by using a model explorer 202 calculating logical relationships associated with the observations using the behavioral model 203 of the system. The means 103 for determining the fault acknowledgements 107 then comprise means for stringing together the logical relationships.

The determination of the logical relationships is carried out using a memory storage unit 108 associating a logical relationship with each observation. This method also uses a model editor 201 allowing the behavioral model to be generated or edited using a description 204 of the system under diagnosis and the observations.

In this method, the logical relationships contained in the storage unit 108 are produced on the ground, during the design phase, by making use of the behavioral model 203 of the system under diagnosis. Use of the behavioral model 203 is made thanks to a model explorer 202. The model explorer produces said logical relationships by means of the exploration of the behavioral model 203. Exploration is understood to mean: search for and extraction of the information contained in the model.

This method has the advantage of being executable by most onboard computers, but on the other hand, it no longer provides any explanation of the order of the observed effects in the form of a sequence of events and no longer allows the changes to the system 100 (e.g. a reconfiguration) to be taken into account.

By way of example, a method called CBR (for Case-based reasoning) may also be mentioned in which a failure is identified by its signature, i.e. a set of observations; then, approximating signatures are sought in a database. Such a method requires: (i) accumulation of experience so as to build a database of the known failures; and (ii) finding a "similarity function" that allows it to be said that one signature is closer to this signature than another. One variant of the MBR method may be mentioned in which the model is a network of statistical dependencies between failure and observations. For example, if an event P is observed, then there is x chance that the failure is A and y chance that it is B. This method requires statistical values to be obtained which assumes an accumulation of experience.

It is recalled that a maintenance function comprises various processing means that may be implemented on one or more computers. These computers equip the system under diagnosis or are dedicated maintenance equipment.

The system under diagnosis is an assembly of processing units collaborating with one another to supply a service. A processing unit may itself be seen as a system and hence as an assembly of processing units. A system may therefore be decomposed in a hierarchical manner by successively considering the assemblies of processing units. Thus, a system under diagnosis may be considered according to various hierarchical levels corresponding to the various assemblies of processing units.

The system under diagnosis comprises a plurality of processing units. It is decomposed into various hierarchical levels into which these various processing units are grouped, a first hierarchical level being said to be lower than a second level when the first level comprises processing units composing processing units of the second level.

These various processing units are non-uniform in terms of processing or memory resources. In addition, certain processing units are not sufficiently powerful to implement the first MBR diagnostic method based on the models. The designer of the system must then deal with the problem of coherence of the diagnostics carried out by all the sub-systems and sent to the highest hierarchical level for consolidation.

It is thus desirable to maintain coherence between the logical relationships contained in the memory units 108 of each lower hierarchical level and the known global model 203 of the highest hierarchical level.

SUMMARY OF THE INVENTION

The invention overcomes at least the aforementioned problems and provides a method and a device that solve the problem of coherence between the information used at all the hierarchical levels of the global system and which may be employed on any of the equipment of the system under diagnosis.

The invention includes a method for performing a maintenance function on a system, referred to as system under diagnosis, comprising a plurality of processing units using a description of said system under diagnosis comprising a description of the processing and memory resources of the various processing units. The method includes: a step for determination of sub-systems based on the description by carrying out a hierarchical decomposition, the system being decomposed into various hierarchical levels into which the various processing units are grouped, a first hierarchical level being said to be lower than a second level when the first level comprises processing units composing processing units of the second level, the various processing units being identified as sub-systems and, for each sub-system steps for determination of a behavioral model of the sub-system with an model editor enabling the behavioral model to be generated starting from the description of the system, and allocation of a diagnostic method depending on the processing and memory resources of said sub-system; and transfer of a diagnostic function to the sub-system depending on the diagnostic method allocated.

In one preferred embodiment, the method allocated is chosen from between a first diagnostic method (MBR) based on the model of the system or a second diagnostic method (RBR) based on predefined logical relationships.

In one preferred embodiment, the method for performing a maintenance function also includes steps for: calculation of the logical relationships for the sub-systems implementing the second diagnostic method (RBR), by exploring the behavioral model of the system under diagnosis; and the transfer of the logical relationships to the sub-systems implementing the second method and the transfer of the model to the sub-systems implementing the first method.

An advantage of the invention is that it solves the technical problem of coherence between the diagnostic methods implemented in the various sub-systems and the global diagnostic method which effects their consolidation at the highest hierarchical level. The invention allows this problem of coherence to be solved while at the same time meeting the constraints on resources and onboard capability raised by the techniques based on the MBR models.

According to one embodiment, the invention implements a function for generation of logical expressions based on the model of the system under diagnosis. The use of this generation function allows the precision and the completeness of the MBR diagnostic to be preserved. Indeed, the precision of the diagnostic will be that of the method based on the MBR models because the list of the failure modes used for the sub-systems implementing the second RBR diagnostic method is generated automatically starting from a common global model. This calculation is made possible by determining a specific model extract for each of the sub-systems of the system under diagnosis and by using this model extract to calculate the logical equations.

The model comprises all the abnormal behaviors and the fault propagation pathways: this is therefore an implicit representation of the failure modes and of their effects. Whereas, in the logical equations used by the second RBR diagnostic method, the list of the failure modes and of their effects is explicit.

According to one aspect of the invention, the model of the system comprises objects representing the elements of the system and their behavior.

According to one aspect of the invention, the model comprises dependency relationships between the objects, a dependency relationship between a first object and a second object indicating that the operation of the first object impacts the operation of the second.

According to one aspect of the invention, the step for determining a model of the sub-systems and the step for calculating logical relationships based on the model of the sub-system includes the following sub-steps: determination of a structural model based on a description of the system under diagnosis, a structural model including the physical and logical relationships between the objects of the model; the determination of a behavioral model, starting from the structural model; and the determination of logical expressions using the behavioral model and a database of predefined symptoms.

The invention provides a device for performing a maintenance function of a system, referred to as system under diagnosis, comprising a plurality of processing units using a description of the system under diagnosis including a description of the processing and memory resources of the various processing units, in which the device includes: means for the hierarchical decomposition of the system under diagnosis into sub-systems based on the description; means for the determination of a model of the sub-system starting from the description of the system; means for the allocation of a diagnostic method depending on the processing and memory resources of said sub-system; and means for the transfer of a diagnostic function to the sub-system depending on the diagnostic method allocated.

In one preferred embodiment, the method allocated is chosen from between a first diagnostic method (MBR) based on the model of the system or a second diagnostic method (RBR) based on predefined logical relationships.

In one preferred embodiment, the device for performing a maintenance function also comprises means for the calculation of the logical relationships for the sub-systems implementing the second diagnostic method (RBR), by exploring the behavioral model of the system under diagnosis.

According to one aspect of the invention, the model of the system includes objects representing elements of the system and their behaviors.

According to one aspect of the invention, the model includes dependency relationships between these objects, one dependency relationship between a first object and a second object indicating that the operation of the first object impacts the operation of the second.

According to one aspect of the invention, the means for the determination of a model of the sub-system based on the description of the system includes: means for the generation of structural models based on a description of the sub-system, a structural model including the physical, logical and functional relationships between the objects of the model; and means for the generation of behavioral models, transforming the structural model into a behavioral model.

BRIEF DESCRIPTION OF THE DRAWINGS

The invention will be better understood and other aspects, features and advantages will become more readily apparent from the following detailed description, presented by way of non-limiting example, and with the aid of the figures, in which.

DETAILED DESCRIPTION

Figure 3:
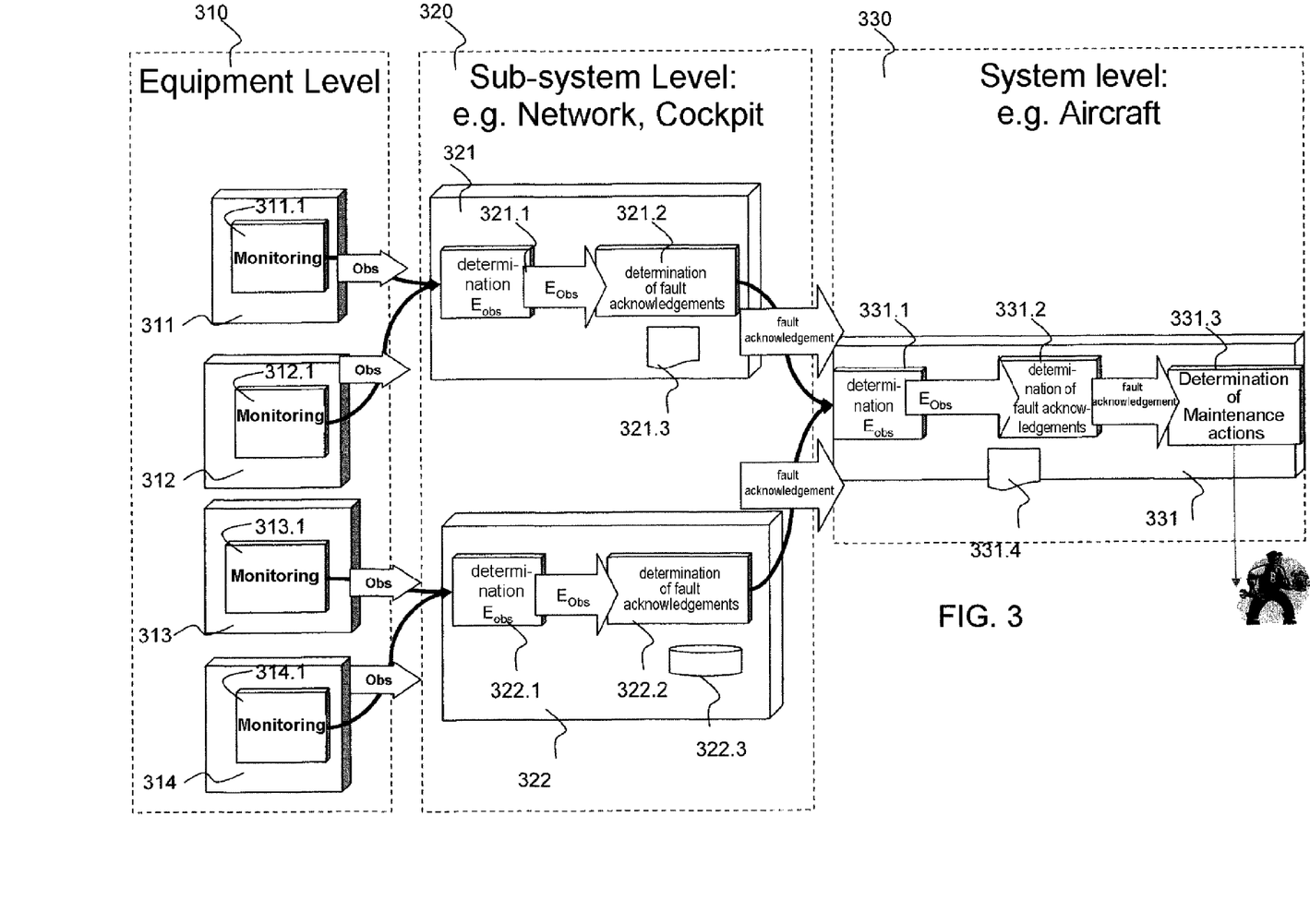
FIG. 3 presents one example of a system under hierarchical diagnosis.

FIG. 3 presents one example of system under hierarchical diagnosis. A first hierarchical level 310 implements means 101 for monitoring. In the example, the first hierarchical level 310 is a level called "equipment". The example comprises four equipment units 311, 312, 313, 314 each implementing means for monitoring 311.1, 312.1, 313.1, 314.1.

A second level 320, higher than the first level, implements, on the one hand, means for the determination of a set of observations based on the messages coming from the means for the monitoring of the first level and, on the other hand, means for the determination of fault acknowledgements. A processing unit of the second level 320 implements means for the determination of a set of observations with observations coming from the lower level processing units composing it. In the example, the second level 320 is called "sub-system" level. A first sub-system level processing unit 321 implements means for the determination of a set of observations 321.1 based on the observations supplied by a monitoring function 311.1 of a first equipment unit 311 and by a monitoring function 312.1 of a second equipment unit 312. This first processing unit 321 also implements means for the determination of fault acknowledgements 321.2. A second sub-system level processing unit 322 implements means for the determination of a set of observations 322.1 based on the observations supplied by a monitoring function 313.1 of a third equipment unit 313 and by a monitoring function 314.1 of a fourth equipment unit 314. This second processing unit 322 also implements means for the determination of fault acknowledgements 322.2.

Finally, a third level 330 comprising a processing unit 331, higher than the second level 320, implements means for the determination of a set of observations based on the fault acknowledgements coming from the second level, means for the determination of fault acknowledgements and means for the determination of the maintenance actions. In the example, this level is called system level. The processing unit implementing the means for the determination of the maintenance actions is for example a maintenance computer on the aircraft.

Figure 4:
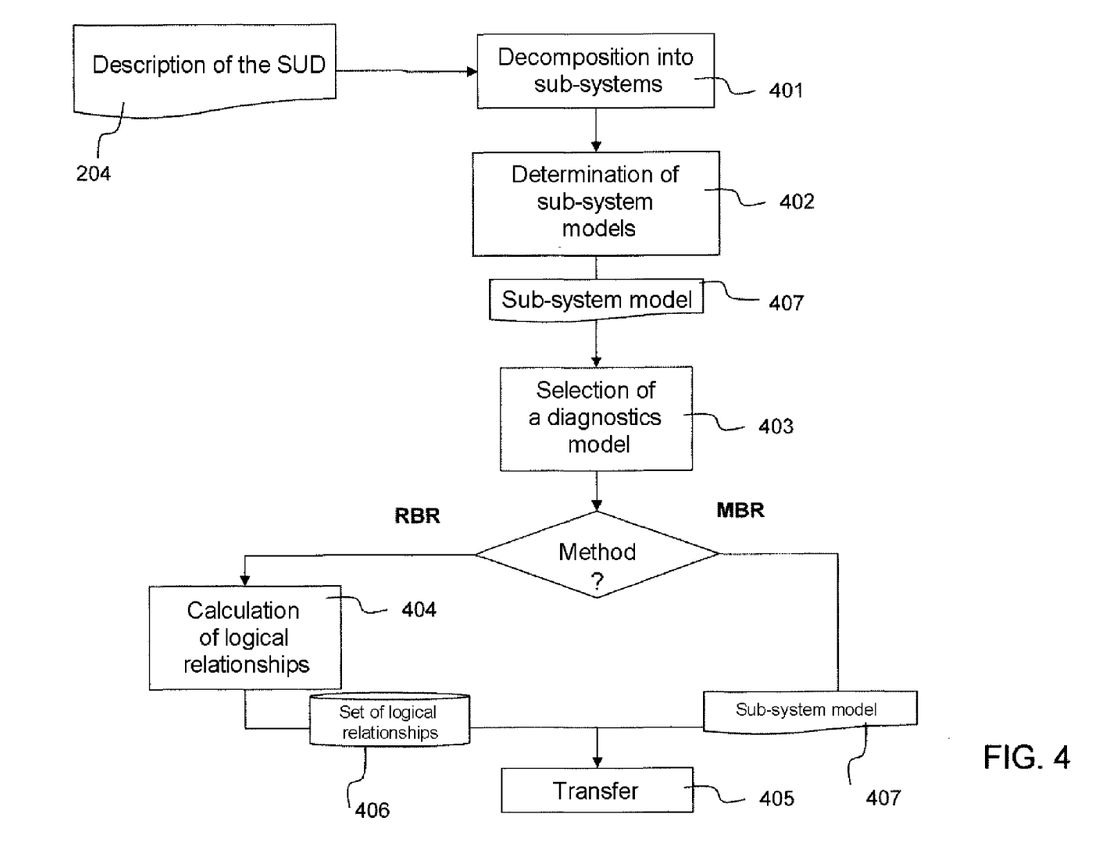
FIG. 4 presents a flow diagram of the method according to the invention.

FIG. 4 presents a flow diagram of the method according to the invention. The method enables the performance of a maintenance function on a system, referred to as system under diagnosis, comprising a plurality of processing units based on description 204 of said system under diagnosis. The model comprises a description of the processing and memory resources of the various processing units.

The method comprises a first step for hierarchical decomposition 401 of the system under diagnosis into sub-systems based on the description of the system.

The method then comprises, for each sub-system, the following steps:
- determination 402 of a behavioral model 407 of the sub-system based on the description of the sub-system,
- the allocation 403 of a diagnostic method depending on the processing and memory resources of said sub-system, the method allocated being either the first MBR diagnostic method based on the model of the system or the second RBR diagnostic method based on predefined logical relationships,
- calculation 404 of the logical relationships for the sub-systems implementing the second RBR diagnostic method,
- the transfer 405 of the logical relationships to the sub-systems implementing the second RBR method and the transfer of the model to the sub-systems implementing the first MBR method.

In the example in FIG. 3, it is assumed that the equipment 322 does not have sufficient processing and/or memory resources for executing the second diagnostic method. Logical relationships 322.3 are calculated using the models of the sub-systems of these equipment units. Each of the equipment units selected for executing the second RBR diagnostic method (in the example, the second processing unit 322 of sub-system level) comprises a database for storing these logical relationships.

Each of the equipment units selected for executing the first MBR diagnostic method (in the example, the first processing unit 321 of sub-system level and the processing unit 331 of the system level) comprises a corresponding model 321.3, 331.4 and a model explorer 202.

Figure 5:
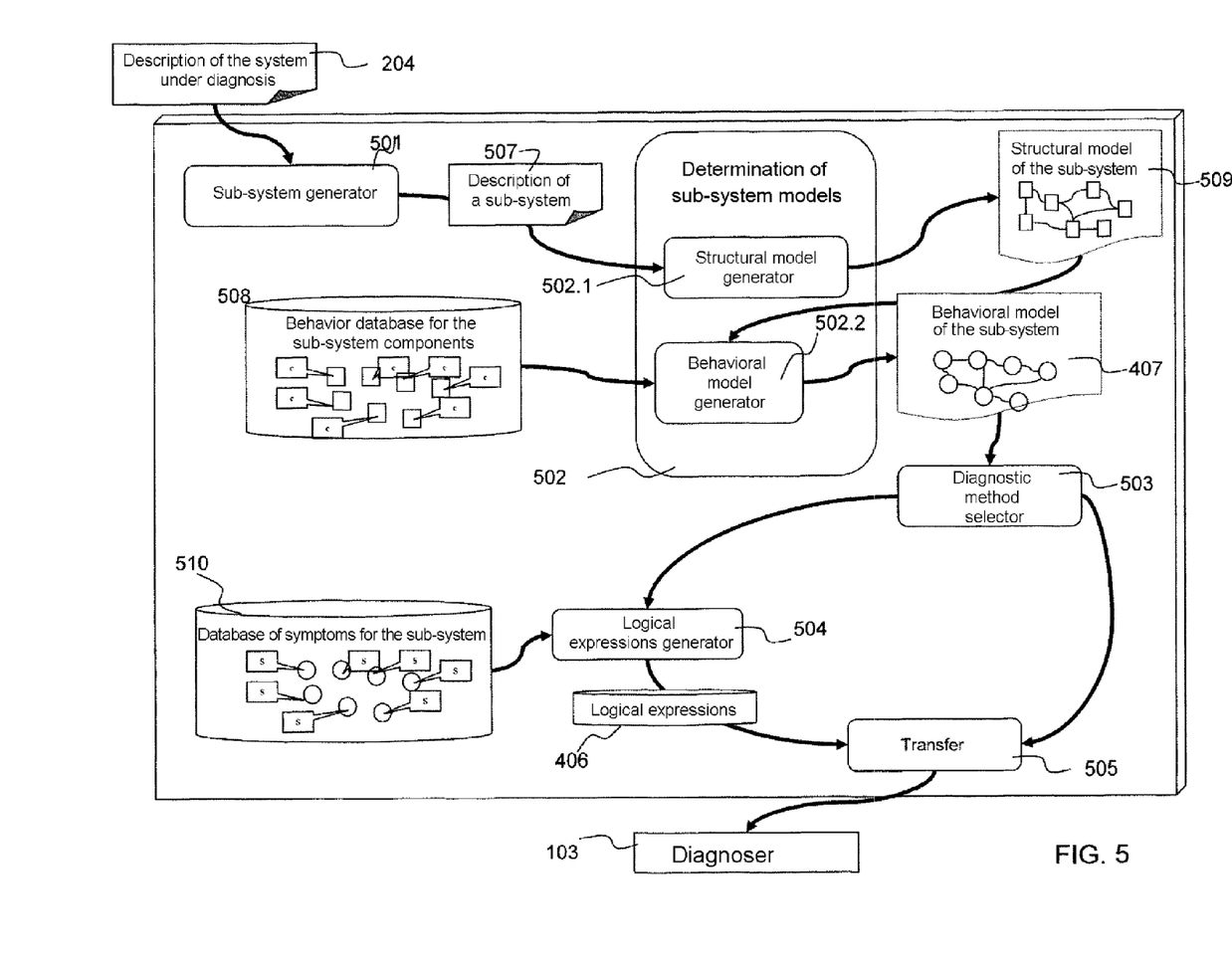
FIG. 5 presents one exemplary embodiment of the device according to the invention.

FIG. 5 presents one exemplary embodiment of the device according to the invention. The device for performing a maintenance function comprises:
- means for the hierarchical decomposition 501 of the system under diagnosis into sub-systems 507 based on the description 204 of the system,
- means for the determination 502 of a behavioral model of the sub-system 407 starting from the description 204 of the system,
- means for the allocation of a diagnostic method 503 depending on the processing and memory resources of said sub-system, the method allocated being a first MBR diagnostic method based on the model of the system or a second RBR diagnostic method based on predefined logical relationships, means for the calculation of the logical relationships 504 for the sub-systems implementing the second RBR diagnostic method, means for the transfer 505 of the logical relationships 406 to the sub-systems implementing the second RBR method and the transfer of the model 407 to the sub-systems implementing the first MBR method. The device is connected to the means 103 for the determination of fault acknowledgements, also known as 'diagnoser', so as to transfer the necessary models and logical equations to the various sub-systems.

According to one feature of the invention, the means for the determination 502 of a model of the sub-system 407 based on the description 507 of the sub-system comprise:

means for the generation 502.1 of structural models 509 based on a description of the target sub-system 507, a structural model 509 including the physical and logical and functional relationships between the objects of the model, means for the generation 502.2 of behavioral models (which can be modeled by dependency relationships), transforming the structural model 509 into a behavioral model 407.

According to one feature of the invention, the means for the generation 504 of logical expressions 406 comprise:

(i) a routing function for the behavioral model listing, for each object of the model, the dependent objects, and (ii) a function for gathering, within a database of symptoms 510, symptoms associated with all the dependent objects and for creating a correspondence between these symptoms and the initial failure.

Figure 6A:
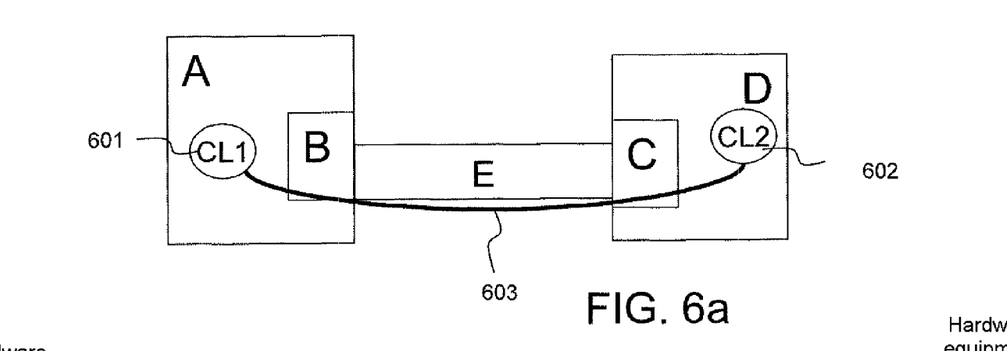
FIG. 6a presents one example of sub-system.
Figure 6B:
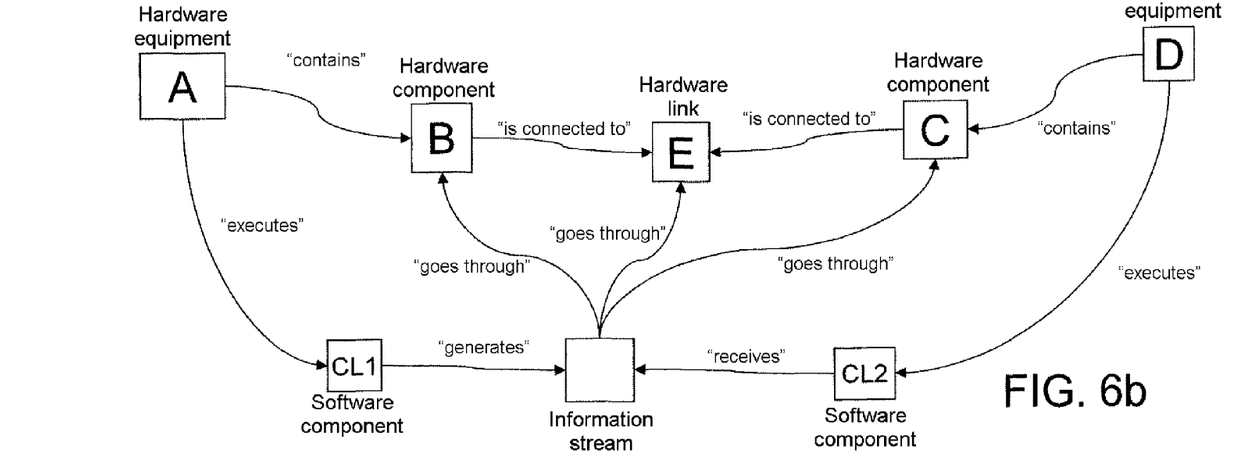
FIG. 6b is a functional representation of the various equipment units and of their hardware and software components.

FIG. 6a presents one example of sub-system comprising a unit of equipment A and a unit of equipment D. The unit of equipment A contains a hardware component B connected to a hardware link E connected to a hardware component C contained within the unit of equipment D. A software element CL1 601 contained within the unit of equipment A generates a stream of information 603 received by a logical element CL2 602 contained by the unit of equipment D. FIG. 6b is a functional and structural representation of the various equipment units and of their hardware and software components. This representation also illustrates the relationships between the components and the equipment units. For example, the unit of equipment A contains the hardware component B and executes the software component CL1. The information stream is channeled via the hardware component B, the hardware link E and the hardware component C.

According to one feature of the invention, the description of the system 204 comprises objects representing elements of the system. These elements are, for example, hardware processing units, hardware or software components, hardware links or information streams. The database 508 for behavior of the components, comprising the description of the behavior of its objects and the behavioral model 407, completes this behavior with the interdependency relationships. A relationship between a first object and a second object indicates that the operation of the first object impacts the operation of the second. Generally speaking, 'dependency' is understood to mean any relationship of the "inclusion" type (for example, containment or aggregation) and any relationship of the "used by" type (for example "generates, receives, etc.).

Figure 7A:
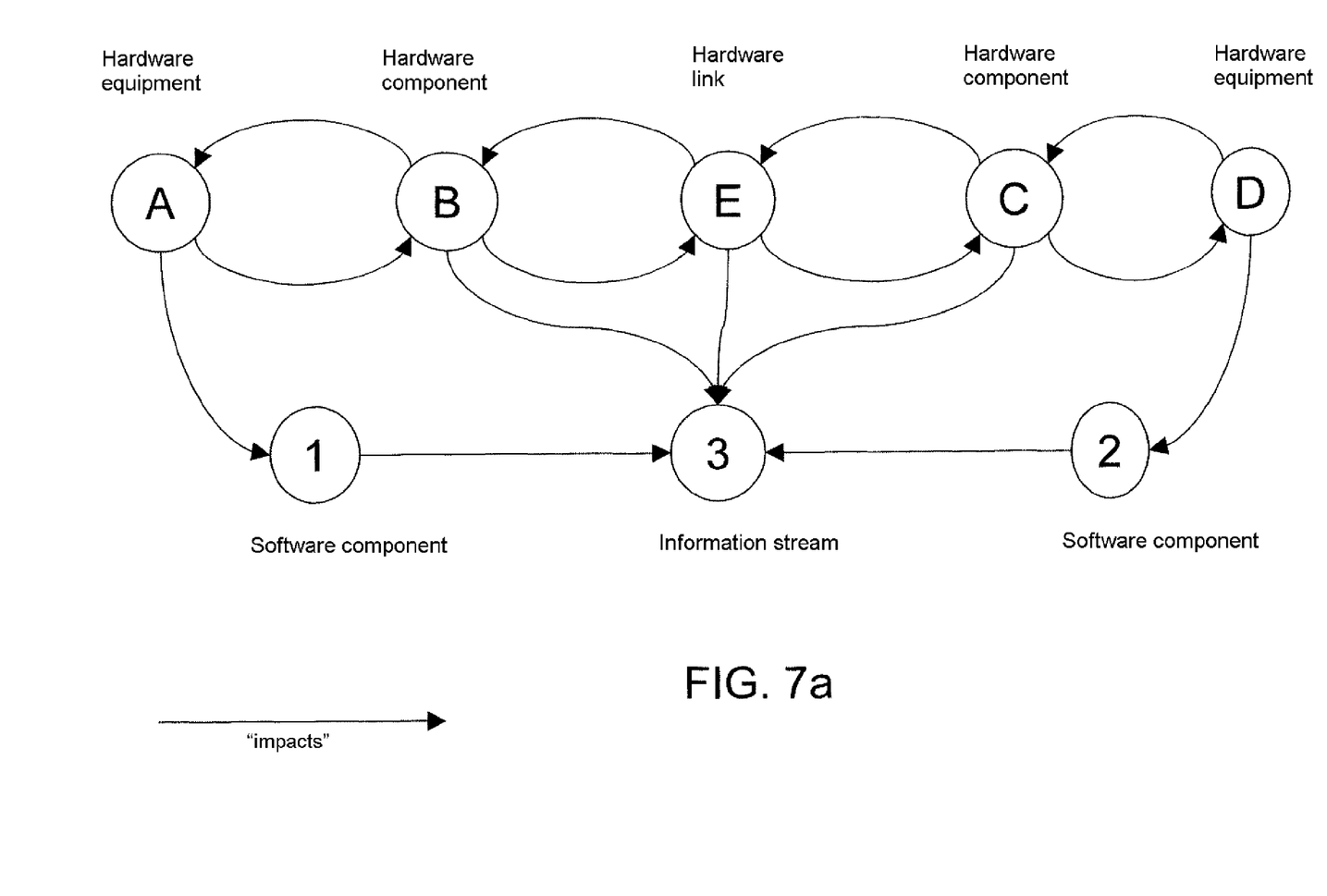
FIGS. 7a and 7b show a dependency model.

FIG. 7a illustrates how functional and structural relationships in FIG. 6b may be translated into dependency relationships in order to model the behavior of the system. An arrow from one object X toward another object Y indicates that the object X impacts the object Y. The following rules are used for generating dependency relationships.

The hardware elements are mutually interdependent. The relationships of the type "object X1 contains object Y1" corresponds to a relationship of the object X1 toward the object Y1 and of the object Y1 toward the object X1.

The software elements depend on the hardware elements (hardware impacts software). The relationships of the type "object X2 executes object Y2" correspond to a dependency relationship of the object X2 toward the object Y2 (X2 impacts Y2).

The information streams depend on the hardware elements and on the software elements. For example, the relationships of the type "object X3 goes via object Y3" correspond to a dependency relationship of the object Y3 toward the object X3 (Y3 impacts X3).

Figure 7B:
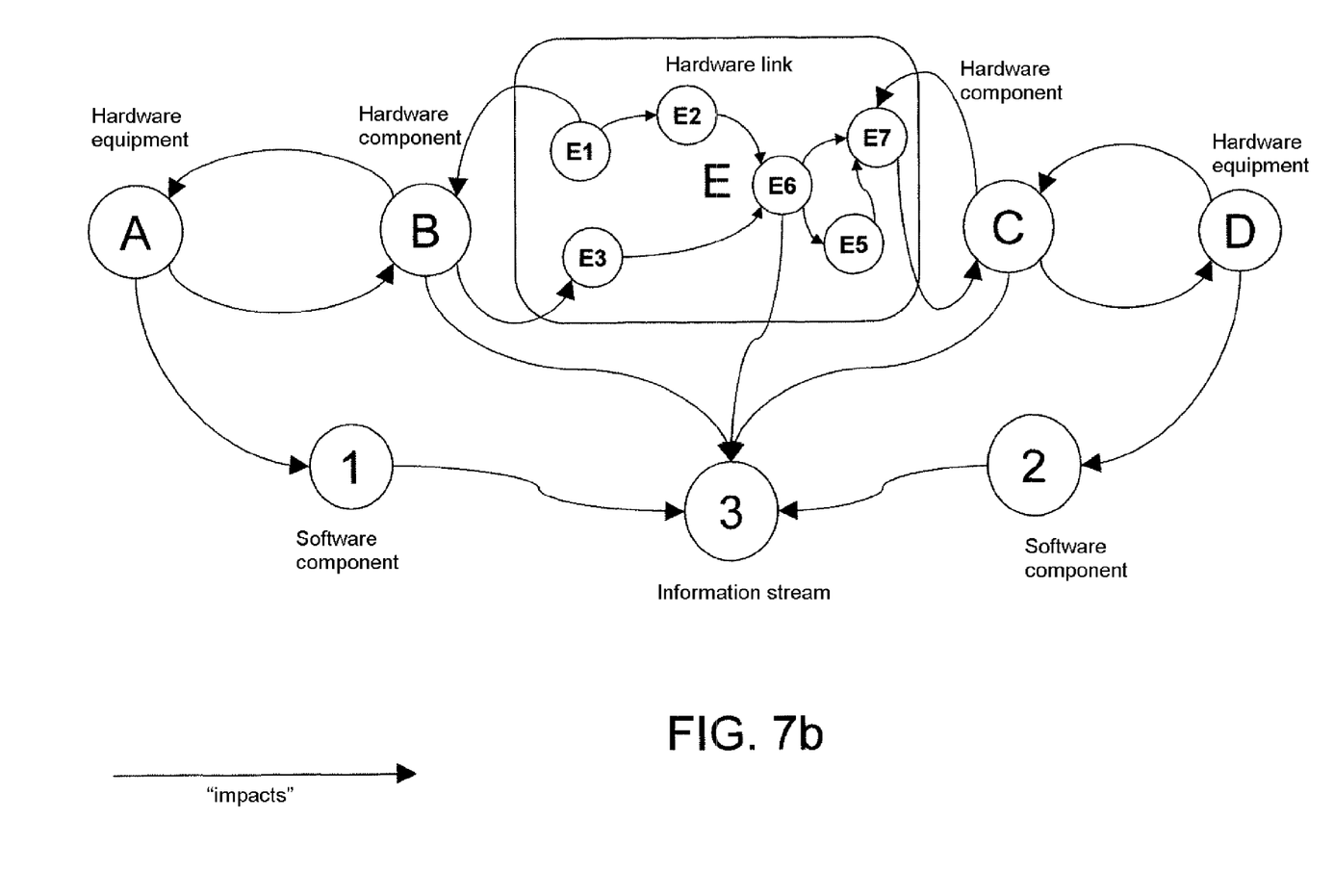

During the determination 402 of the sub-models in a hierarchical architecture, a whole set of dependency relationships may advantageously be foregone in such a manner that the sub-model thus obtained remains of reduced complexity. For example, in FIG. 7a are shown a hardware link E and its dependency relationships, and in FIG. 7b the reality of the hardware link E is highlighted; a hardware link may be composed of a plurality of links E1, E2, E3, E5, E6, E7, for example, of cables, of connectors and of switches, of radio links, of antennas, etc. The global state of the link E is dependent on an set of sub-components and on their dependencies. This global state may be substituted a complex set of sub-states, without altering the nature of the global dependency relationship.

Figure 8:
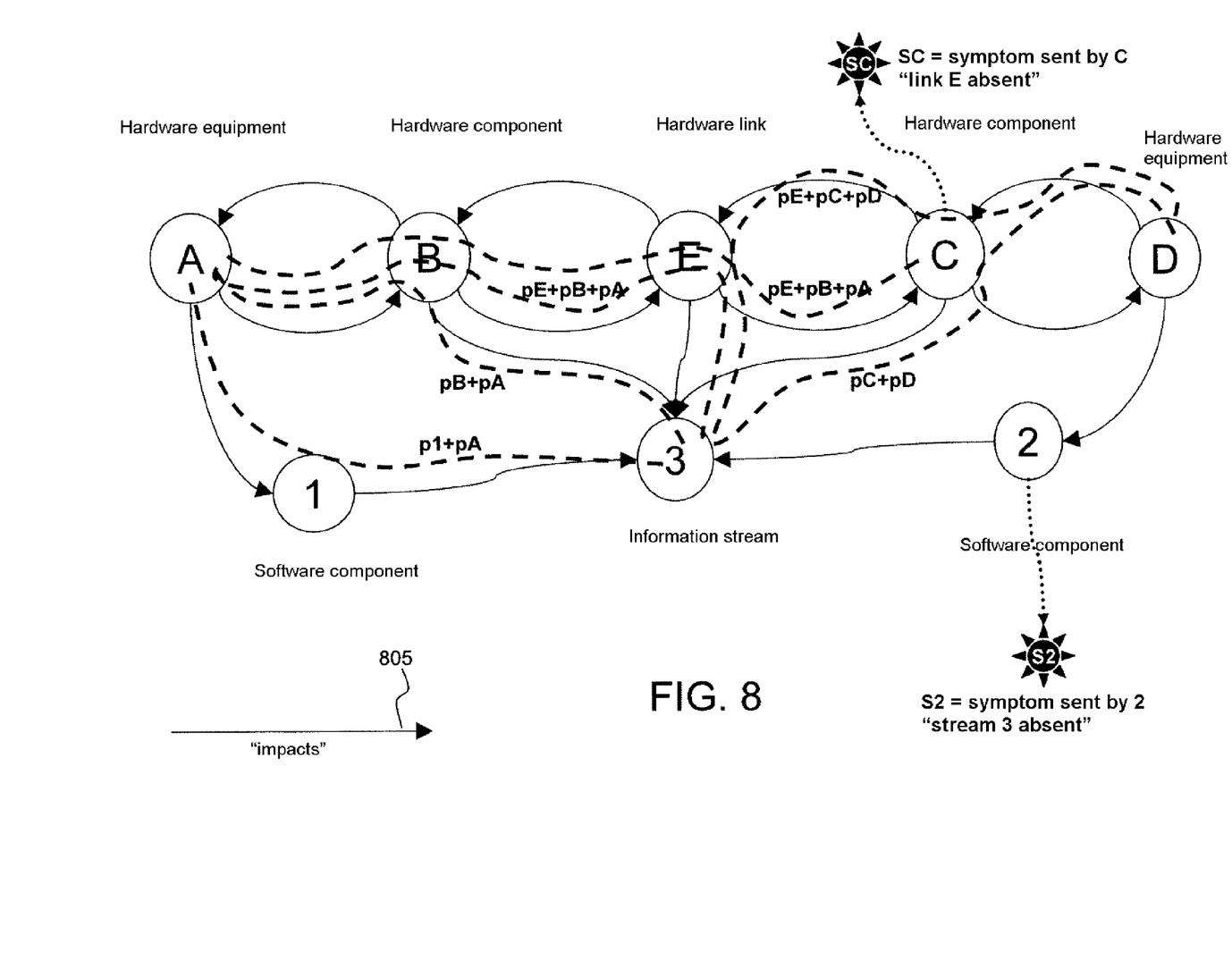
FIG. 8 illustrates the generation of a logical relationship.

FIG. 8 illustrates the generation of a logical relationship.

In the system proposed, the symptom database 510 contains the hardware component C equipped with a monitoring function emitting the symptom SC meaning "link E absent", and the software component 2 equipped with a monitoring function S2 meaning "flux 3 absent".

Following the "impact" relationship in their reverse direction, a new meaning "depend on" is given to the relationship. The dependency relationships 805 then show:

S2 points to a failure of the stream 3,

The state of the stream 3 depends on the state of 1, of A, of B, of E, of C, of D.

By adopting the following convention "px=failure of x", the state of the stream 3, coming from the dependency relationships routing, may be written:

$$S2=(p1+pA)+(pB+pA)+(pE+pB+pA)+(pE+pC+pD)+(pC+pD) \; S2=p1+pA+pB+pC+pE+pD.$$

It will be noted here that the stream 3 does not have an intrinsic failure, so it does not come into the logical relationship.

The routing of the dependency relationships for SC yields the equation:

$$SC=pE+pB+pA.$$

It will be noted here that the hardware link may be faulty. It has also been shown that this failure may result from a set of failures for which E is just an overall expression.

The relationships S2 and SC are stored in the database 406 so as to be used by the means 103 carrying out the RBR method.

The dependency relationships 805 may also come from an analysis of the FMEA (Failure Mode Effect Analysis) type from which a causal tree can be extracted.

In other cases, the search for structural dependencies can be replaced by a fault propagation analysis. In this case, it is the symptoms generated by the initial failure which follow the structural pathways.

According to one embodiment of the invention, the device for performing a maintenance function also comprises means for selecting processing parameters and memory resources. These parameters are used during the step for allocation of a diagnostic method 403 depending on the processing and memory resources.

These parameters are selected by an operator in order to define what capacities are needed on a computer in order to execute one diagnostic method rather than another. In particular, an operator can force the use of one method over another on all of the sub-systems. For example, in the case where the diagnostic methods used are of the MBR and RBR type, if the operator defines the parameters in such a manner that the MBR method requires more processing resources than all of the computers in the system, then all the computers will have the method of the RBR type allocated to them.

What is claimed is:

1. A method for performance of a maintenance function of a system under diagnosis, the system under diagnosis comprising a plurality of processing units using a description of the system under diagnosis, the description of the system under diagnosis comprising a description of processing and memory resources of the plurality of processing units, said method comprising:
   determining sub-systems of processing units based on the description of the system under diagnosis by carrying out a hierarchical decomposition, the system under diagnosis being decomposed into various hierarchical levels into which the plurality of processing units are grouped, a first hierarchical level being lower than a second hierarchical level when the first hierarchical level comprises processing units of the second hierarchical level, and
   for each sub-system of processing units:
      determining a behavioral model of the sub-system with a model editor enabling the behavioral model of the sub-system to be generated starting from the description of the system under diagnosis; and
      allocating a diagnostic method based on processing and memory resources of said sub-system; and
      transferring a diagnostic function to the sub-system based on the allocated diagnostic method.

2. The method as claimed in claim 1, wherein the allocated diagnostic method is chosen between a first diagnostic method based on a behavioral model of the system under diagnosis and a second diagnostic method based on predefined logical relationships.

3. The method as claimed in claim 2, further comprising:
   calculating logical relationships for each sub-system implementing the second diagnostic method, by exploring the behavioral model of the system under diagnosis; and
   transferring the logical relationships to each sub-system implementing the second diagnostic method and transferring the behavioral model of the system under diagnosis to each sub-system implementing the first diagnostic method.

4. The method as claimed in claim 2, wherein the behavioral model of the system under diagnosis comprises objects representing elements of the system and behavior of the elements.

5. The method as claimed in claim 4, wherein the behavioral model of the system under diagnosis comprises dependency relationships between the objects, a dependency relationship between a first object and a second object indicating that operation of the first object impacts operation of the second object.

6. The method as claimed in claim 3, wherein determining the behavioral model of each sub-system and calculating the logical relationships for each sub-system comprises:
   determining a structural model of the system under diagnosis based on the description of the system under diagnosis, the structural model including physical and logical relationships between objects of the structural model;
   determining the behavioral model of the system under diagnosis based on the structural model; and
   determining logical expressions using the behavioral model of the system under diagnosis and a predefined database of symptoms.

7. A device for performing a maintenance function of a system under diagnosis, the system under diagnosis comprising a plurality of processing units using a description of the system under diagnosis, the description of the system under diagnosis comprising a description of processing and memory resources of the plurality of processing units, said device comprising:
   means for hierarchically decomposing the system under diagnosis into sub-systems of processing units based on the description of the system under diagnosis;
   means for determining a behavioral model of each sub-system starting from the description of the system under diagnosis;
   means for allocating a diagnostic method based on processing and memory resources of each sub-system; and
   means for transferring a diagnostic function to each sub-system based on the allocated diagnostic method.

8. The device as claimed in claim 7, wherein the allocated diagnostic method is chosen between a first diagnostic method based on a behavioral model of the system under diagnosis and a second diagnostic method based on predefined logical relationships.

9. The device as claimed in claim 8, further comprising means for calculating logical relationships for each sub-system implementing the second diagnostic method, by exploring the behavioral model of the system under diagnosis.

10. The device as claimed in claim 8, wherein the behavioral model of the system under diagnosis comprises objects representing elements of the system and behavior of the elements.

11. The device as claimed in claim 10, wherein the behavioral model of the system under diagnosis comprises dependency relationships between the objects, a dependency relationship between a first object and a second object indicating that operation of the first object impacts operation of the second object.

12. The device as claimed in claim 7, wherein the means for determining a behavioral model of each sub-system based on the description of the system under diagnosis comprises:
   means for generating structural models based on descriptions of each sub-system, a structural model including physical, logical and functional relationships between objects of the structural model; and
   means for generating behavioral models of the sub-systems by transforming the structural models into the behavioral models of the sub-systems.

* * * * *